United States Patent [19]

Cole et al.

[11] Patent Number: 5,490,536
[45] Date of Patent: Feb. 13, 1996

[54] PINCH TUBE PROPORTIONING VALVE AND CONTROL CAM CARTRIDGE THEREFOR

[75] Inventors: George S. Cole, Pebble Beach, Calif.; Harry W. Edwards, Barrington, Ill.

[73] Assignee: George S. Cole & Associates, Incorporated, Thousand Oaks, Calif.

[21] Appl. No.: 393,430

[22] Filed: Feb. 23, 1995

[51] Int. Cl.⁶ .................. F16K 11/14; F16K 51/524; F16K 43/00
[52] U.S. Cl. .................. 137/315; 137/607; 137/625.4; 137/636.4; 251/4; 251/251
[58] Field of Search .................. 137/607, 625.4, 137/636.1, 636.4, 315, 454.2, 454.5, 454.6, 801; 251/4, 7, 118, 120, 251; 74/55, 56

[56] References Cited

U.S. PATENT DOCUMENTS

| | | | |
|---|---|---|---|
| 3,172,426 | 3/1965 | Cole | 137/636.4 |
| 3,468,344 | 9/1969 | Sanford | 137/636.4 |
| 3,519,018 | 7/1970 | Cole et al. | 137/625.4 |
| 3,646,966 | 3/1972 | Smart | 137/625.4 |
| 3,774,643 | 11/1973 | Cole et al. | 137/636.4 |
| 3,805,842 | 4/1974 | Thompson et al. | 137/636.4 |
| 3,861,421 | 1/1975 | Thompson | 137/636.4 |
| 3,978,890 | 9/1976 | Barnum | 137/636.4 |
| 4,359,067 | 11/1982 | Cole | 137/636.4 |
| 4,607,659 | 8/1986 | Cole | 137/636.4 |

*Primary Examiner*—George L. Walton
*Attorney, Agent, or Firm*—Emrich & Dithmar

[57] ABSTRACT

A pinch tube proportioning valve includes support structure defining an elongated valve cavity having a longitudinal axis and a pair of spaced resilient valve tubes disposed in the cavity and respectively providing communication between two fluid supply conduits and a fluid outlet. A control cam cartridge is receivable in the valve cavity between the valve tubes. The cartridge includes a cylindrical housing closed at one end and carrying at its closed end a guide pin extending axially up through the housing and receivable in an axial bore in an elongated tapered cam member, which is telescopically received in the open end of the housing. Diametrically opposed openings are formed in the side wall of the housing for receiving the valve tubes to permit engagement thereof by the cam member, which is axially and rotatably movable to control proportioning and flow rate through the valve tubes.

18 Claims, 2 Drawing Sheets

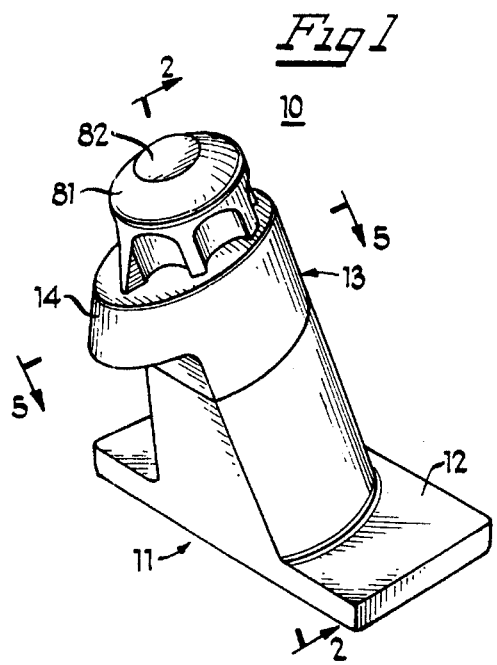
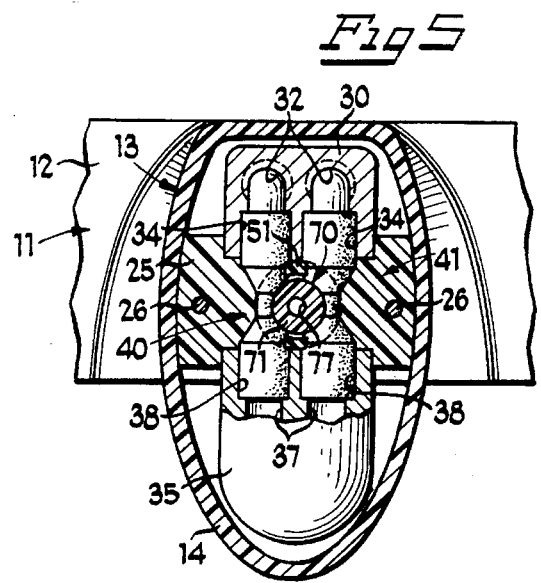
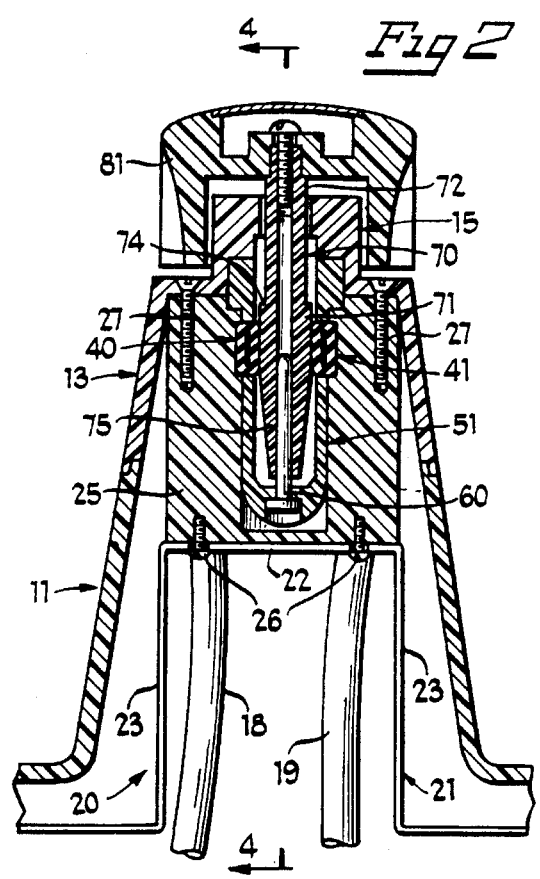
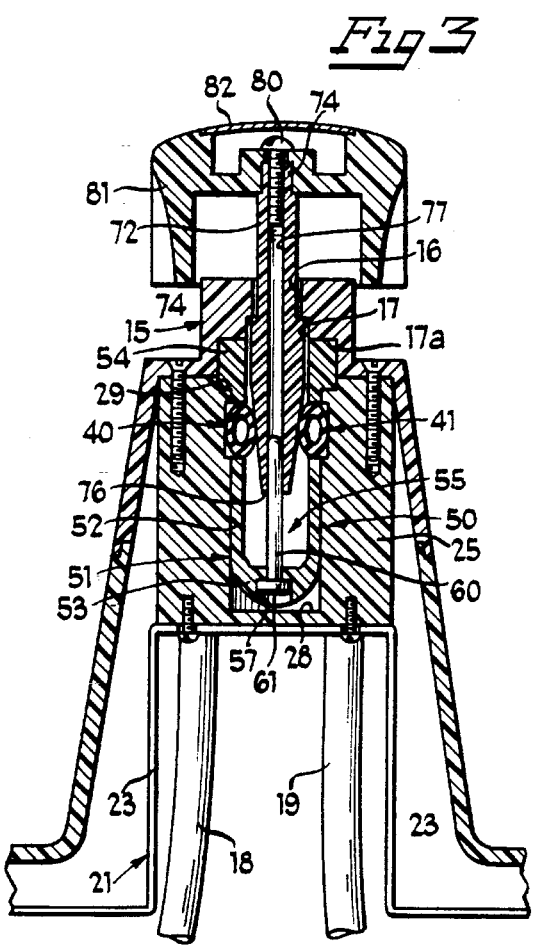

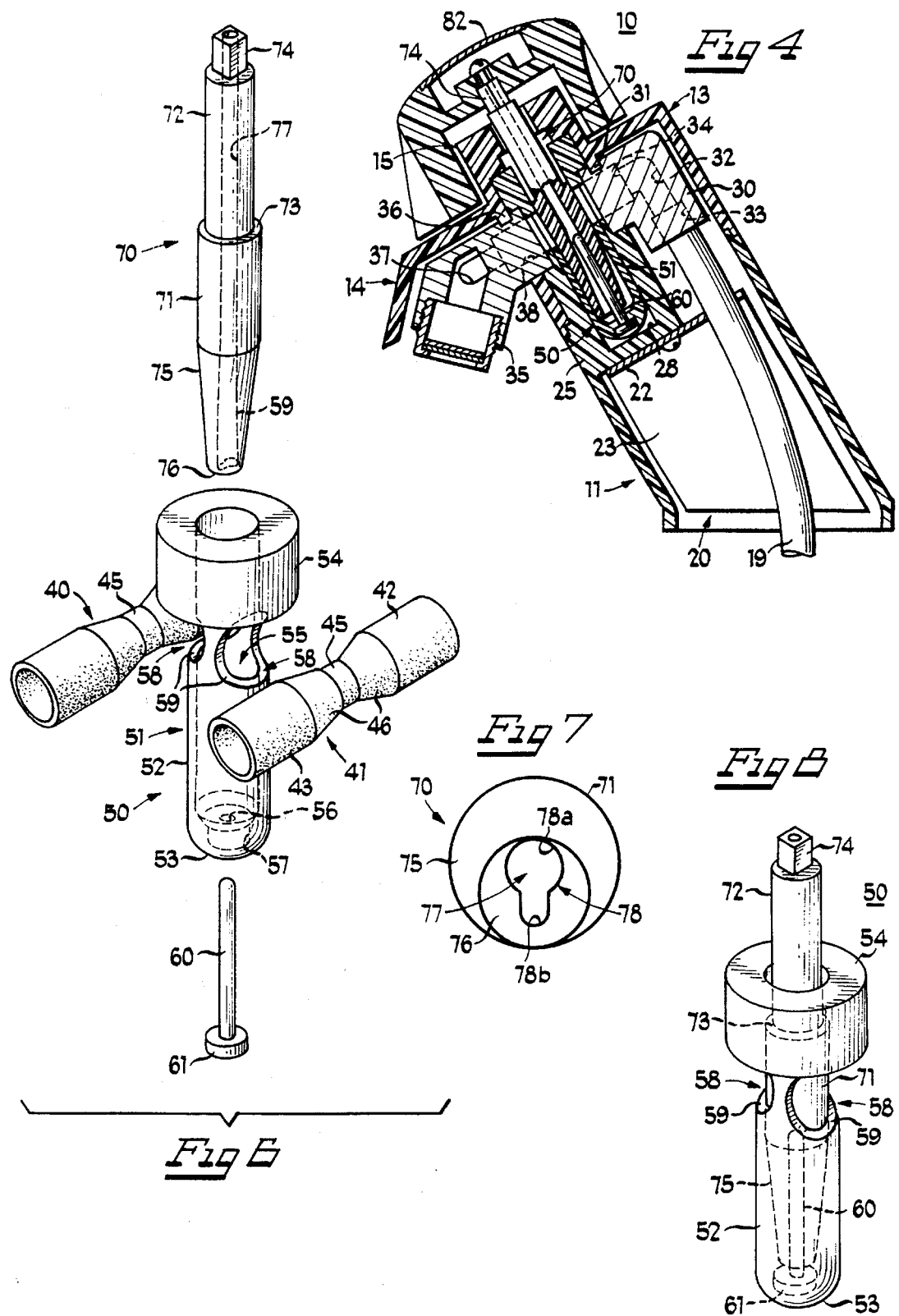

PINCH TUBE PROPORTIONING VALVE AND CONTROL CAM CARTRIDGE THEREFOR

BACKGROUND OF THE INVENTION

1. Field of the Invention

The invention relates to single control proportioning valves for liquids, such as hot and cold water and, more particularly, to pinch tube valves, wherein a control cam is disposable between a pair of resilient valve tubes for engagement with each to control the degree of pinching of, and thereby the proportioning and flow rate through, the valve tubes.

2. Description of the Prior Art

The present invention is an improvement of the valve disclosed in U.S. Pat. No. 4,359,067. That valve includes a support structure defining an elongated valve cavity having a longitudinal axis and a pair of spaced resilient valve tubes disposed in the cavity and respectively providing communication between two fluid supply conduits and a fluid outlet. The valve tubes extend transversely of the cavity axis on either side thereof. A guide pin is fixed in the support structure and extends upwardly into the valve cavity from the bottom thereof coaxially therewith. An elongated, tapered cam member extends axially into the valve cavity between the valve tubes and has an axial bore therethrough for receiving therein the guide pin. The cam member has a cylindrical portion and an eccentric conical portion and is rotatably and axially slidably movable within the valve cavity. When the cam member is completely retracted within the valve cavity, its cylindrical portion engages the valve tubes and completely pinches them off. As the cam member is withdrawn or extended from the cavity, the conical portion thereof passes between the valve tubes, allowing them to expand and permitting an increasing flow rate therethrough, proportional to the amount of extension of the cam member. As the cam member is rotated, the eccentric conical portion presses or pinches the two valve tubes different amounts, so as to control the proportioning therebetween, all in a known manner.

In such prior valve constructions, the cam member must be lubricated, typically with a silicone lubricant. In use this lubricant is wiped onto the valve tubes, facilitating sliding movement of the cam member relative to the flexible valve tubes. This is particularly important in the case of new tubes, which are dry. Thus, if a new cam is inserted as a replacement part, along with replacement valve tubes, the cam must either be manually lubricated at the time of installation or, alternatively, must be pre-lubricated by the manufacturer. In the latter case, the lubrication can commonly be wiped off during storage, transportation and the like by the cam packaging, which may typically be a transparent plastic bag or similar container. Also, the cam may become damaged by handling.

SUMMARY OF THE INVENTION

It is a general object of the invention to provide an improved pinch tube proportioning valve which avoids the disadvantages of prior valves while affording additional structural and operating advantages.

An important feature of the invention is the provision of a valve of the type set forth, which protects the actuating cam member and the lubricant thereon.

A further feature of the invention is the provision of a valve of the type set forth which is of relatively simple and economical construction.

Yet another feature of the invention is the provision of a control cam cartridge for use in a valve of the type set forth.

A still further feature of the invention is the provision of a control cam cartridge of the type set forth, which includes a protective housing for the cam member and is insertable as a unit in a pre-existing valve structure.

These and other features are attained by providing a control cam cartridge for a pinch tube proportioning valve comprising: a housing including a cylindrical side wall having an axis and open and closed ends and an end wall closing the side wall at the closed end and cooperating therewith to define a cam chamber, the side wall having a pair of diametrically opposed openings therethrough adjacent to the open end communicating with the chamber, and an elongated tapered cam member telescopically received in the chamber through the open end of the housing and rotatable therein and axially slidably movable therein between retracted and extended positions.

Further features of the invention are attained by providing in a pinch tube proportioning valve including a support structure defining an elongated valve cavity having a longitudinal axis and a pair of spaced resilient valve tubes disposed in the cavity and respectively providing communication between two fluid supply conduits and a fluid outlet, the improvement comprising: a control cam cartridge removably insertable as a unit in the valve cavity between the valve tubes, the cartridge including a housing having a cylindrical side wall with open and closed ends and an end wall closing the side wall at the closed end and cooperating therewith to define a cam chamber, the side wall having a pair of notches therein at opposite sides thereof respectively forming openings communicating with the chamber, the closed end of the housing being removably insertable in the valve cavity between the tubes to a use position with the tubes respectively seated in the notches and projecting into the chamber, and an elongated tapered cam member telescopically received in the chamber for engagement with the tubes, the cam member being rotatable about the axis and axially movable between retracted closing and extended opening positions and having a cylindrical valve-closing portion and an eccentric frustoconical valve-opening portion which control proportioning and the rate of flow.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a faucet incorporating a pinch tube proportioning valve including a control cam cartridge in accordance with the present invention, with the valve shown in its closed position;

FIG. 2 is an enlarged, fragmentary view in vertical section taken along the line 2—2 in FIG. 1;

FIG. 3 is a view similar to FIG. 2, with the valve illustrated in its fully open position;

FIG. 4 is a fragmentary view in vertical section taken along the line 4—4 in FIG. 2;

FIG. 5 is an enlarged, fragmentary sectional view taken along the line 5—5 in FIG. 1;

FIG. 6 is a further enlarged, exploded, perspective view of the control cam cartridge assembly of the present invention and the associated valve tubes;

FIG. 7 is a still further enlarged, bottom plan view of the control cam member of the cartridge assembly of FIG. 6; and FIG. 8 is a perspective view of the cartridge assembly of FIG. 6 in its assembled condition.

DESCRIPTION OF THE PREFERRED EMBODIMENT

Referring to FIG. 1, there is illustrated a faucet 10 utilizing the single control pinch tube proportioning valve and control cam cartridge therefor of the present invention. While the illustrated faucet is designed for lavatory use, the control cam cartridge and valve of the present invention are suitable for faucets designed also for kitchen, tub and shower, as well as various industrial uses.

The faucet 10 is of the type illustrated in U.S. Pat. No. 4,359,067, having an exterior lower shroud or housing 11 including a base 12 adapted to engage a marginal surface of a sink or other member (not shown) with which the faucet is associated. An upper housing 13 is mounted atop the lower housing 11 and encloses a spout or outlet structure 14. Referring also to FIGS. 2–5, a turret 15 projects upwardly from the upper end of the upper housing 13 and has a cylindrical bore 16 extending axially therethrough, provided with counterbores 17 and 17a. The faucet 10 controls the flow of hot and cold water, respectively supplied through conduits 18 and 19, but it will be appreciated that the present invention could be used with a valve for controlling the flow of other liquids.

The faucet 10 has a composite support assembly 20, including a generally inverted U-shaped bracket 21 including a web 22 and a pair of depending legs 23 and 24, each of which has a laterally extending foot extending beneath the associated part of the base 12. The web 22 is fixedly secured to the lower end of a support structure 25, as by fasteners 26. The support assembly 20 is disposed within the housing 11, 13, the support structure 25 being secured, as by fasteners 27 to the upper end of the upper housing 13. Formed in the upper end of the support structure 25 in substantially coaxial communication with the bore 16 is a cylindrical valve cavity 28, having a counterbored shoulder 29 at its upper end.

Fixed to the rear end of the support structure 25 is an elbow 30 having a groove in its upper end which receives a flange 31 of the upper housing 13 (FIG. 4). Formed through the elbow 30 are two channels 32, each having counterbore 33 at one end thereof and counterbore 34 at the other end thereof, the counterbores 33 respectively receiving the upper ends of the supply conduits 18 and 19. Also fixed to the front end of the support structure 25 is a spout 35, having a groove in its upper end receiving a flange 36 (FIG. 4) of the upper housing 13. Channels 37 extend through the spout 35 and join a common outlet opening, the channels 37 being respectively provided with counterbores 38 at their inlet ends.

A pair of substantially identical, spaced, resilient tubes 40 and 41 extend transversely through the valve cavity 28 between the elbow 30 and the spout 35. Each of the valve tubes 40 and 41 has cylindrical end portions 42 and 43, a central reduced-diameter neck 45 and a pair of frustoconical portions 46, respectively connecting the end portions 42 and 43 to the neck 45, as can best be seen in FIG. 6. The cylindrical end portions 42 are, respectively, received in the counterbores 34 of the elbow 30, while the cylindrical end portions 43 are, respectively, received in the counterbores 38 of the spout 35, as is best illustrated in FIG. 5. The counterbores 34 and 38 may be slightly tapered at an angle of about 5° to provide a snug wedge fit of the valve tube end portions 42 and 43 therein. If desired, the support structure 25 may be configured to conform to the outline of the outer sides of the valve tubes 40 and 41 to provide lateral support therefor, as illustrated in FIG. 5.

Referring also to FIGS. 6–8, the present invention includes a control cam cartridge assembly 50 for controlling operation of the faucet 10. More particularly, the cartridge assembly 50 includes an elongated, circularly cylindrical housing 51 having a cylindrical side wall 52 closed at the lower end thereof by an end wall 53 having a generally part-spherical outer surface. Unitary with the side wall 52 at the upper end thereof and extending laterally outwardly therefrom around the entire circumference thereof is a support flange 54. The side wall 52 cooperates with the end wall 53 to define within the housing 51 an elongated cam chamber 55. Formed in the end wall 53 coaxially with the side wall 52 is a central bore 56, the outer end of which is provided with an enlarged circular counterbore 57. Formed in the side wall 52 at diametrically opposed locations thereon closely adjacent to the flange 54 are a pair of notches 58. More specifically, each of the notches 58 defines a part-cylindrical seat surface 59 which essentially represents the intersection of the side wall 52 with an imaginary circular cylinder, such that the axes of the imaginary cylinders are parallel to each other and orthogonal to the axis of the housing 51 and respectively disposed on opposite sides thereof.

An elongated guide pin 60 extends upwardly through the bore 56 in the end wall 53 and into the cam chamber 55 coaxially therewith and preferably slightly more than half the length thereof, the guide pin 60 being provided with an enlarged head 61 at its lower end which is press-fitted in the counterbore 57 or, alternatively, may be fixed to the end wall 53 by suitable means.

The cartridge assembly 50 also includes an elongated cam member 70 which has a circularly cylindrical central portion 71, separated from a reduced-diameter cylindrical stem portion 72 by an annular shoulder 73 (FIG. 6). The reduced-diameter stem portion 72 is provided at its distal end with a square coupling end 74. The cam member 70 is provided at its opposite end with an eccentric conical portion 75 terminating in a flat, circular end surfaces 76. Extending axially through the cam member 70 is an elongated central bore 77, which is circularly cylindrical over most of its length but which, in the conical portion 75, has a generally keyhole-shaped transverse cross section 78 (FIG. 7). More specifically, as can best be seen in FIG. 7, the keyhole-shaped transverse cross section has a circularly cylindrical portion 78a and an oblong, radially outwardly extending stem portion 78b. The circular portion 78a is simply an extension of the rest of the bore 77. The radially outer surface of the stem portion 78b tapers axially upwardly and radially inwardly, as at 59 (FIG. 6), from a maximum length at the end surface 76 to a zero length where it merges with the circular portion 78a adjacent to the upper end of the conical portion 75. The purpose of the keyhole-shaped cross sectional area is to facilitate core insertion and removal for molding purposes.

The diameter of the cylindrical central portion 71 is very slightly less than the diameter of the chamber 55 in the housing 51 and is adapted to be received telescopically therein, with the end surface 76 disposed adjacent to the end wall 53, as illustrated in FIGS. 2–4 and 8. The bore 77 is dimensioned to receive therein the guide pin 60 for centering the cam member 70 and for guiding longitudinal sliding movement thereof. It will be appreciated that the cartridge assembly 50 is normally packaged as a replacement unit, with the cam member 70 fully retracted in the housing 51, as illustrated, for example, in FIGS. 2 and 8. In this regard, the cam member 70 will be pre-lubricated with a suitable silicone lubricant during manufacture. Thus, the housing 51 will serve to protect the lubricant from accidental removal or wiping off during storage and transit, and will also serve to protect the cam member 70 from damage.

As will be explained more fully below, the cartridge assembly 50 is intended to be received, as a unit, in the valve cavity 28 of the faucet 10. The square coupling end 74 is adapted to mate in a square receptacle in a handle knob 81, which receives a mounting screw 80 threadedly engaged in the upper end of the bore 77 for fixing the knob 81 to the cam member 70. If desired, a decorative cap plate 82 may be provided to cover the screw 80.

Referring in particular to FIGS. 2–5, the operation of the cartridge assembly 50 will now be described. It will be appreciated that the cam member 70 is substantially the same as the cam member used in the prior art valve assembly disclosed in U.S. Pat. No. 4,359,067, and the cartridge assembly 50 is designed as a replacement for that prior art cam member. Typically, that prior art cam member will be replaced at the same time that the valve tubes 40 and 41 are replaced. Thus, it will be appreciated that, if desired, replacement valve tubes 40 and 41 could be packaged with the cartridge assembly 50 of the present invention. It can be seen that the shoulder 73 of the cam member 70 is designed to stop against the counterbore 17 of the turret 15 to prevent removal of the cam member 70. Thus, when it is desired to remove the pre-existing cam member 70, the upper housing 13 of the faucet 10 must first be removed. More specifically, in order to perform a replacement operation, the handle knob 81 is first removed by removing the cap plate 82 and unscrewing the screw 80. Then, the upper housing 13 is removed by unscrewing the screws 27. This permits the cam member 70 and the valve tubes 40 and 41 to be removed.

In the valve of the prior art faucet of U.S. Pat. No. 4,359,067, a guide pin is fixed in the bottom of the valve cavity 28. However, the prior art valve assembly may or may not be provided with such a guide pin. Accordingly, the cartridge assembly of the present assembly may be provided in two versions. One version 50, illustrated in the drawings, includes the guide pin 60 and is designed for use in faucet assemblies which do not have a guide pin fixed therein. An alternative version (not shown) may dispense with the guide pin 60 and is designed for use in prior art faucet assemblies which already have a guide pin fixed therein. The following description will apply to the former configuration.

After the old cam member and valve tubes 40 and 41 have been removed, new valve tubes 40 and 41 are installed in place. Then the cartridge assembly 50 is inserted into the valve cavity 28 between the valve tubes 40 and 41. In this regard, it will be appreciated that the valve tubes 40 and 41 flexibly yield to permit the housing 51 to pass therebetween. The cartridge assembly 50 is inserted to a fully installed position, illustrated in FIGS. 2–4, wherein the flange 54 seats against the shoulder 29 of the valve cavity 28. It will be appreciated that the cartridge assembly 50 is so oriented that the notches 58 respectively face the valve tubes 40 and 41, so that when the cartridge assembly 50 is fully installed, the necks 45 of the valve tubes 40 and 41 will, respectively, seat in the notches 58 and project into the chamber 55. The upper housing 13 of the faucet 10 is then reinstalled, with the upper surface of the cartridge assembly support flange 54 seating in the counterbore 17a of the turret 15, and with the reduced diameter stem 72 of the cam member 70 fitting through the bore 16 of the turret 15. The handle knob 81 is then reinstalled on the square coupling end 74 of the cam member 70.

The operation of the cartridge assembly 50 is exactly the same as the operation of the valve mechanism of the prior art faucet. Thus, the cam member 70 is axially slidably movable within the housing 51 between a fully retracted or off position, illustrated in FIGS. 2 and 4, and a fully extended or open position, illustrated in FIG. 3. In the closed position, the cylindrical central portion 71 of the cam member 70 engages the valve tubes 40 and 41 to pinch them closed, thereby preventing the flow of fluid therethrough. In the open position, the eccentric conical portion 75 of the cam member 70 engages the valve tubes 40 and 41, permitting them to expand and allow the flow of fluid therethrough, with the amount of expansion being proportional to the amount of extension of the cam member 70 in a known manner. The cam member 70 is rotatable about its axis to vary the proportioning between the two fluids because of the eccentricity of the conical portions 75, in a well-known manner.

It will be appreciated that, in use, the lubricant on the cam member 70 will be wiped onto the valve members 40 and 41 to keep them moist and flexible.

In a constructional model of the invention, the cam member 70, the housing 51 and the guide pin 60 may all be formed of a suitable plastic material, such as that sold by E. I. Du Pont de Nemours and Co. under the trade name DELRIN, or any other suitable moldable plastic material.

From the foregoing, it can be seen that there has been provided an improved control cam cartridge assembly for a pinch tube valve, which is of simple and economical construction and which affords protection for the control cam and the lubricant thereon, and which is insertable as a replacement unit in a pre-existing pinch tube valve.

We claim:

1. A control cam cartridge removably mounted as a unit in a valve body of a pinch tube proportioning valve, said control cam cartridge comprising: a housing including a cylindrical side wall having an axis and open and closed ends and an end wall closing said side wall at said closed end and cooperating therewith to define a cam chamber, said side wall having a pair of diametrically opposed openings therethrough adjacent to said open end communicating with said chambers, said openings being respectively defined by notches extending transversely through said housing on opposite sides of and orthogonal to said axis, each of said notches forming a part-cylindrical seat surface which defines the intersection between said housing and an imaginary cylindrical surface for receiving an associated pinch tube and an elongated tapered cam member telescopically received in said chamber through said open end of said housing and rotatable therein and axially slidably movable therein between retracted and extended positions.

2. The cartridge of claim 1, wherein said housing includes a laterally outwardly extending flange at the open end of said side wall around the entire circumference thereof.

3. The cartridge of claim 1, wherein said end wall has a substantially part-spherical outer surface.

4. The cartridge of claim 1, wherein said cam member includes a cylindrical portion and an eccentric conical portion.

5. A control cam cartridge removably mounted as a unit in a valve body of a pinch tube proportioning valve, said control cam cartridge comprising: a housing including a cylindrical side wall having an axis and open and closed ends and an end wall closing said side wall at said closed end and cooperating therewith to define a cam chamber, said side wall having a pair of diametrically opposed openings therethrough adjacent to said open end communicating with said chamber, said openings being respectively defined by notches extending transversely through said housing on opposite sides of and orthogonal to said axis, each of said notches forming a part-cylindrical seat surface which defines the intersection between said housing and an imaginary cylindrical surface for receiving an associated pinch tube, a guide pin extending from said end wall into said chamber coaxially with said cylindrical side wall, and an elongated cam member telescopically received in said chamber through said open end of said housing and rotatable therein and axially slidably movable therein between retracted and extended positions, said cam member having an axial bore therethrough telescopically receiving said guide pin therein for guiding movement thereof between the extended and retracted positions thereof.

6. The cartridge of claim 5, wherein said end wall has an axial bore therein for receiving said guide pin therethrough.

7. The cartridge of claim 6, wherein said end wall bore has an enlarged-diameter counterbore, said guide pin having an enlarged head receivable in said counterbore.

8. The cartridge of claim 5, wherein said axial bore is generally keyhole-shaped in transverse cross section at its pin-receiving end.

9. The cartridge of claim 8, wherein said keyhole-shaped cross section includes a circularly cylindrical portion and an oblong stem portion, said stem portion tapering from a maximum dimension at said pin-receiving end of said cam member to a minimum dimension spaced axially from said pin-receiving end.

10. In a pinch tube proportioning valve including a support structure defining an elongated valve cavity having a longitudinal axis and a pair of spaced resilient valve tubes disposed in the cavity and respectively providing communication between two fluid supply conduits and a fluid outlet, the improvement comprising: a control cam cartridge removably insertable as a unit in the valve cavity between the valve tubes, said cartridge including a housing having a cylindrical side wall with open and closed ends and an end wall closing said side wall at said closed end and cooperating therewith to define a cam chamber, said side wall having a pair of notches therein at opposite sides thereof respectively forming openings communicating with said chamber, said closed end of said housing being removably insertable in the valve cavity between the tubes to a use position with the tubes respectively seated in said notches and projecting into said chamber, and an elongated tapered cam member telescopically received axially in said chamber for engagement with the tubes, said cam member being rotatable about the axis and axially movable between retracted closing and extended opening positions and having a cylindrical valve-closing portion and an eccentric frusto-conical valve-opening portion which control the proportioning and the rate of flow through the valves tubes.

11. The valve of claim 10, wherein said housing includes a laterally outwardly extending flange at the open end of said side wall around the entire circumference thereof.

12. The valve of claim 10, wherein said end wall has a substantially part-spherical outer surface.

13. The valve of claim 10, wherein said openings are respectively defined by notches extending transversely through said housing on opposite sides of and perpendicular to said axis, each of said notches forming a part-cylindrical seat surface which defines the intersection between said housing and an imaginary cylindrical surface.

14. The valve of claim 10, wherein said cam member has an axial bore therethrough, and further comprising a guide pin receivable telescopically in said axial bore for guiding movement of said cam member between the extended and retracted positions thereof.

15. The valve of claim 14, wherein said guide pin is carried by said housing.

16. The valve of claim 15, wherein said end wall bore has an enlarged-diameter counterbore, said guide pin having an enlarged head receivable in said counterbore.

17. The valve of claim 14, wherein said axial bore is generally keyhole-shaped in transverse cross section at its pin-receiving end.

18. The valve of claim 17, wherein said keyhole-shaped cross section includes a circularly cylindrical portion and an oblong stem portion, said stem portion tapering from a maximum dimension at said pin-receiving end of said cam member to a minimum dimension spaced axially from said pin-receiving end.

* * * * *